(12) United States Patent
Del Rio Garcia

(10) Patent No.: US 10,308,272 B2
(45) Date of Patent: Jun. 4, 2019

(54) STEERING WHEEL AND METHOD OF MANUFACTURING SUCH STEERING WHEEL

(71) Applicant: Dalphi Metal Espana S.A., Vigo (ES)

(72) Inventor: Alejandro Del Rio Garcia, Oia (ES)

(73) Assignee: DALPHI METAL ESPANA S.A., Vigo (ES)

( * ) Notice: Subject to any disclaimer, the term of this patent is extended or adjusted under 35 U.S.C. 154(b) by 283 days.

(21) Appl. No.: 15/296,113

(22) Filed: Oct. 18, 2016

(65) Prior Publication Data

US 2017/0129527 A1   May 11, 2017

(30) Foreign Application Priority Data

Nov. 5, 2015 (DE) .................. 10 2015 014 257

(51) Int. Cl.
| | |
|---|---|
| B62D 1/06 | (2006.01) |
| B60R 21/05 | (2006.01) |
| B29C 45/44 | (2006.01) |
| B29C 44/58 | (2006.01) |
| B29C 45/14 | (2006.01) |
| B62D 1/04 | (2006.01) |
| B29C 44/12 | (2006.01) |
| B29K 105/04 | (2006.01) |

(Continued)

(52) U.S. Cl.
CPC ............ *B62D 1/06* (2013.01); *B29C 44/1266* (2013.01); *B29C 44/582* (2013.01); *B29C 45/14819* (2013.01); *B29C 45/4407* (2013.01); *B60R 21/05* (2013.01); *B62D 1/04* (2013.01); *B29C 44/5681* (2013.01); *B29K 2023/12* (2013.01); *B29K 2025/06* (2013.01); *B29K 2075/00* (2013.01); *B29K 2105/04* (2013.01); *B29K 2705/00* (2013.01); *B29K 2705/02* (2013.01); *B29L 2031/3047* (2013.01)

(58) Field of Classification Search
CPC ........ B62D 1/06; B62D 1/04; B29C 44/1266; B29C 44/582; B29C 45/14819; B29C 45/4407; B60R 21/05
See application file for complete search history.

(56) References Cited

U.S. PATENT DOCUMENTS

| | | | |
|---|---|---|---|
| 4,535,221 A * | 8/1985 | Holsworth ............ | B62D 1/065 219/204 |
| 6,079,292 A | 6/2000 | Raetsen | |

(Continued)

FOREIGN PATENT DOCUMENTS

JP    2004067000    3/2004

OTHER PUBLICATIONS

EPO Machine Translation of JP 2004067000 (A), Fujimori et al., Mar. 4, 2004. (Year: 2004).*

*Primary Examiner* — Vinh Luong

(74) *Attorney, Agent, or Firm* — Tarolli, Sundheim, Covell & Tummino LLP

(57) ABSTRACT

A steering wheel (1) includes a steering wheel skeleton (10), a foam padding (11) surrounding the steering wheel skeleton (10) at least partially, and a wrapping (12) which encompasses the foam padding (11) at least in portions. Adjacent longitudinal edges (13) of the wrapping (12) are covered by a profile bead (20), in particular a decorative bead (24). The profile bead (20) includes at least one anchoring element (21) which is fixed directly in the foam padding (11) for fastening the wrapping (12).

5 Claims, 3 Drawing Sheets

(51) Int. Cl.
*B29K 705/00* (2006.01)
*B29K 705/02* (2006.01)
*B29L 31/30* (2006.01)
*B29K 23/00* (2006.01)
*B29K 25/00* (2006.01)
*B29K 75/00* (2006.01)
*B29C 44/56* (2006.01)

(56) References Cited

U.S. PATENT DOCUMENTS

| | | | |
|---|---|---|---|
| 6,443,030 B1 | 9/2002 | Schuler | |
| 6,494,114 B1 * | 12/2002 | Schuler | B62D 1/06 74/552 |
| 7,513,175 B2 * | 4/2009 | Xu | B60R 13/02 74/552 |
| 2002/0017157 A1 * | 2/2002 | Kreuzer | B62D 1/06 74/552 |
| 2005/0050981 A1 * | 3/2005 | Warhover | B62D 1/06 74/552 |
| 2005/0252332 A1 * | 11/2005 | Miltenberger | B62D 1/04 74/552 |
| 2007/0137413 A1 | 6/2007 | Xu et al. | |
| 2009/0007721 A1 * | 1/2009 | Cortina | B62D 1/06 74/558 |
| 2014/0026711 A1 * | 1/2014 | Bertrand | B62D 1/06 74/558 |
| 2014/0328077 A1 * | 11/2014 | Tovar | B62D 1/046 362/511 |
| 2016/0090116 A1 * | 3/2016 | Joh | B62D 1/06 74/558 |

* cited by examiner

STEERING WHEEL AND METHOD OF MANUFACTURING SUCH STEERING WHEEL

RELATED APPLICATION

This application claims priority from German Patent Application No. 10 2015 014 257.7, filed Nov. 5, 2015, the subject matter of which is incorporated herein by reference.

BACKGROUND OF THE INVENTION

The invention relates to a steering wheel in accordance with the preamble of claim 1. Furthermore, the invention relates to a method of manufacturing such steering wheel. A steering wheel according to the preamble of claim 1 is known, for example, from U.S. Pat. No. 6,079,292 A.

Steering wheels known from practice substantially comprise a steering wheel skeleton encompassed by foam padding. In high-quality steering wheels it is moreover provided to add a wrapping to the team padding. Frequently leather or imitation leather is used as material for the wrapping. Due to the complicated geometry of a steering wheel the leather cannot be arranged at the steering wheel by an automated process. Rather, a complex and cost-intensive manual process is required to fix the leather on the steering wheel. For this purpose, usually appropriate leather cuts are provided which are laid around the foam padding until longitudinal edges of the leather cuts are adjacent to each other. The adjacent longitudinal edges then are manually stitched together. The connection of the longitudinal edges is carried out directly on the product which additionally impedes the stitching process. Hence leather-wrapping of a steering wheel is labor-intensive and time-consuming which in total results in high costs.

U.S. Pat. No. 6,079,292 A seeks to address this problem in that instead of stitching the longitudinal leather edges a profile bead for fixing the longitudinal rims of the leather by clamping in a groove of the foam padding. Concretely speaking, it is provided in the known steering wheel that the foam padding includes a groove directed inwardly to the central axis of the steering wheel into which the longitudinal edges of the wrapping leather are tucked. After that the profile bead is inserted between the longitudinal edges of the leather tucked into the groove. The profile bead is tucked into the groove of the foam padding, wherein the profile bead urges against the longitudinal edges of the leather projecting into the groove and thus forces them against the foam padding of the steering wheel. Concretely, this state of the art provides that the longitudinal edges of the leather are arranged to be clamped between the profile bead and the foam padding.

The clamping fixation of the leather in a groove of the foam padding known from the state of the art has drawbacks in practice. During use of the steering wheel frequently torsional forces are introduced into the leather wrapping. As a result the leather wrapping turns around the foam padding. In the area of the longitudinal edges of the leather wrapping tensional forces are acting which are capable of easily overcoming the clamping force of the profile bead. Thus the profile bead can easily detach and release the longitudinal ends of the leather wrapping. As a consequence, the leather wrapping detaches from the foam padding.

SUMMARY OF THE INVENTION

It is the object of the invention to state a steering wheel, especially a leather steering wheel comprising a wrapping which can be manufactured by an automated process and in which the connection between the foam padding and a profile bead and, resp., between the foam padding and a wrapping is improved. It is a further object of the invention to state a corresponding manufacturing method.

In accordance with the invention, this object is achieved with respect to the steering wheel by the subject matter of claim 1 and with respect to the manufacturing method by the subject matter of claim 10.

Concretely, the invention is based on the idea to state a steering wheel, especially a leather steering wheel, comprising a steering wheel skeleton, a foam padding at least partly surrounding the steering wheel skeleton and a wrapping which encompasses the foam padding at least in portions. Adjacent longitudinal edges of the wrapping are covered by a profile bead, especially a decorating strip. The profile bead includes at least one anchoring element that is fixed directly in the foam padding for fastening the wrapping.

The improvement intended by the invention results from the fact that the profile bead is fixed directly in the foam padding of the steering wheel. This entails a definitely more stable connection between the profile bead and the foam padding and at the same time a stable connection between the wrapping and the foam padding. Accordingly, the profile bead substantially forms a connecting element for tightly coupling the wrapping to the foam padding. In this way the risk of the wrapping peeling off due to torsional forces is prevented.

At the same time, the profile head enables the manufacture of a steering wheel by a wrapping to be appropriately automated. Especially stitching of the longitudinal edges of the wrapping can be avoided or dropped at least to a great extent.

The anchoring element is fixed in the foam padding preferably by form closure so that the profile bead cannot be separated from the foam padding in a non-destructive manner. This contributes to the stability of the entire steering wheel.

In a preferred embodiment of the invention, it may be provided that the anchoring element engages in an undercut formed in the foam padding. Hence in the foam padding an undercut or a recess may be arranged which interacts with the anchoring element for connecting the profile bead to the foam padding, it may be concretely provided that the anchoring element can be locked with or, resp., clip-connected to the undercut. Advantageously the anchoring element is anchored in the undercut by form closure.

Concretely speaking, the anchoring element may include a shank and a head, the head having a retaining surface aligned substantially perpendicularly to or at an acute angle with the shank. The retaining surface aligned perpendicularly to or at an acute angle with the shank preferably is arranged opposite to a decorating flange of the profile bead or faces the decorating flange. The latter is integrally formed with the longitudinal end of the shank opposite to the bead and substantially forms an outwardly visible decorative bead of the profile bead. The retaining surface of the head faces said decorating flange so that the retaining surface of the head has a barb-like function by its extension aligned perpendicularly to or at an acute angle with the shank. This promotes the positive anchoring of the anchoring element in the foam padding.

Concretely, in preferred configurations of the invention it may be provided that the retaining surface is adjacent at least partially flush to a mating surface of the undercut of the foam padding. The surface contact between the retaining surface and the mating surface entails a stable connection between the profile bead and the foam padding. In particular the connection is preferably not detachable in a non-destructive manner.

Another preferred embodiment of the invention provides that the longitudinal edges of the wrapping are fixed at least in portions to the foam padding exclusively by the profile bead. In other words, at least portions of the longitudinal edges of the wrapping are fixed to the foam padding by the profile bead only. Further fixation means are neither provided nor required in these areas. The suggested direct connection between the profile bead and the foam padding is sufficient for fixing so that additional stitchings, bonded joints or welded connections can be dispensed with.

The profile bead preferably interconnects the longitudinal edges of the wrapping. It may especially be provided that the profile bead extends between the longitudinal edges of the wrapping, with a decorating flange of the profile bead overlapping the longitudinal edges of the wrapping at least in portions. In this respect the decorating flange substantially forms a bridge between the longitudinal edges of the wrapping. Thus the longitudinal edges of the wrapping are interconnected. It is outlined in this context that it is not excluded that the longitudinal edges of the wrapping also extend at least partially into a groove of the foam padding. In any case the profile bead itself is designed to be tightly fixed, preferably by form closure, in the foam padding.

The profile bead is preferably arranged on an inner circumferential surface of a steering wheel rim. At these points the connection of longitudinal edges of a wrapping is suggested. In particular, this arrangement of the profile bead is preferred by users of the steering wheel as in this way the profile bead is not disposed directly in the gripping area. The inner circumferential surface of a steering wheel rim substantially points toward the center of the steering wheel and, during normal use, is reached only by the fingers of a user. So far the profile bead does not disturb the user.

Alternatively or additionally, in the steering wheel according to the invention the profile bead may be designed to be arranged on an inner surface of a steering wheel spoke. Also the inner surfaces of steering wheel spokes lend themselves to the fixation of the wrapping. The inner surfaces of the steering wheel spokes extending substantially opposite to the inner circumferential surfaces of the steering wheel rim are not felt to be disturbing for the arrangement of profile beads, either.

In this context, it has to be considered that a stitching of the longitudinal edges of the wrapping may be dispensed with due to the use of the profile bead. In this way a steering wheel can be provided which exhibits a comparatively smooth outer surface which produces a comfortable haptic feeling. This feeling can be improved when the profile bead itself consists of high-quality material or at least the decorating flange is covered with high-quality material. For example, the profile bead and at least the decorating flange may be wrapped with leather and/or imitation leather. It is equally possible that at least the decorating flange includes a wooden veneer. Furthermore, the profile bead may include a metal or a carbon fiber material or may be made of the same.

In general, according to the invention the wrapping may be designed to be formed by leather and/or imitation leather. Such materials are preferred as they leave a good mark in terms of haptics.

In a further preferred configuration of the steering wheel according to the invention the profile bead is preferably provided to include plural anchoring elements which are spaced apart from each other. The foam padding may have a corresponding number of undercuts. The use of plural separate anchoring elements on a profile bead increases the positioning accuracy of the profile bead. This is of advantage to the automated manufacturing process.

An independent aspect of the invention relates to a method of manufacturing a steering wheel, especially a steering wheel in accordance with the foregoing explanations. Preferably the method comprises the following steps of:

a. inserting a steering wheel skeleton into a foam-padding mold;

b. inserting a shaping element into the foam-padding mold, the shaping element having at least one female mold of an undercut to be formed in a foam padding;

c. filling heated foaming material into the foam-padding mold for foam-covering the steering wheel skeleton;

d. removing the shaping element from the heated foaming material; and e. cooling the foam padding.

Hence in the present invention during foam-covering of the steering wheel skeleton at the same time a template is inserted into the foam-padding mold so that undercuts are resulting in the injected foam padding. The template is removed from the foaming material while the latter is still heated and hot, respectively. This offers the advantage that the heated foaming material withdraws into the mold impressed before so that an efficient undercut is retained in the foam padding. In this way tearing or destruction of the foam padding is efficiently prevented. In other words, in the method according to the invention the shaping element is especially designed to be removed before cooling of the foam padding.

Preferably the shaping element is removed as long as the foaming material is flowable. Certain flowability enables the foaming material to withdraw into the afore-impressed form as soon as the shaping element is removed. Simultaneously the flowability prevents cracks from occurring in the foam padding by removing the shaping element.

In an especially preferred embodiment of the method according to the invention it is provided that the foaming material does not cool and/or solidify before the shaping element is removed. By cooling and solidifying the undercuts formed in the foam padding are fixed and stabilized. In this way the undercuts can be properly used as clip-connecting elements.

The female mold of the shaping element may be formed by an extension the shape of which corresponds to the shape of an anchoring element of the profile bead which is adapted to be engaged in the later formed undercuts in the foam padding. The shaping element substantially may include an extension having a configuration corresponding to the design of the anchoring element of the profile bead. In this way undercuts positively interacting with the anchoring elements of the profile bead can be introduced into the foam padding.

With respect to the foam padding it may be further provided that at least in the area of a steering wheel rim a wrapping, especially leather and/or imitation leather, is applied. The longitudinal edges of the wrapping are fixed by a profile bead which is engaged in the undercuts in the foam padding. The wrapping imparts a high-quality appearance to the steering wheel.

BRIEF DESCRIPTION OF THE DRAWINGS

Hereinafter the invention will be explained in detail by way of an embodiment with reference to the enclosed schematics, in which.

DESCRIPTION

Figure 1:
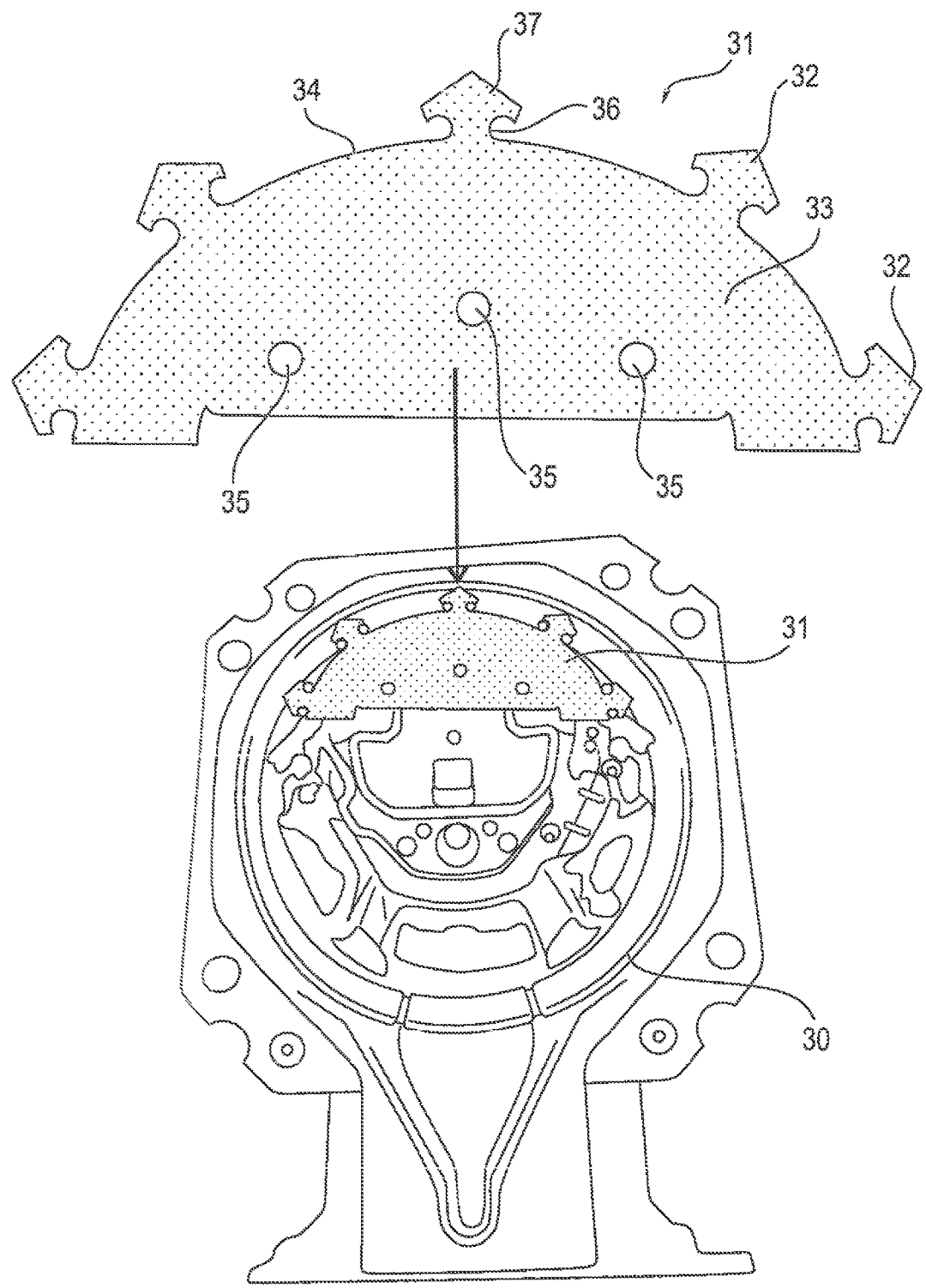
FIG. 1 shows a top view of a foam-padding mold in which a shaping element is arranged.
Figure 2:
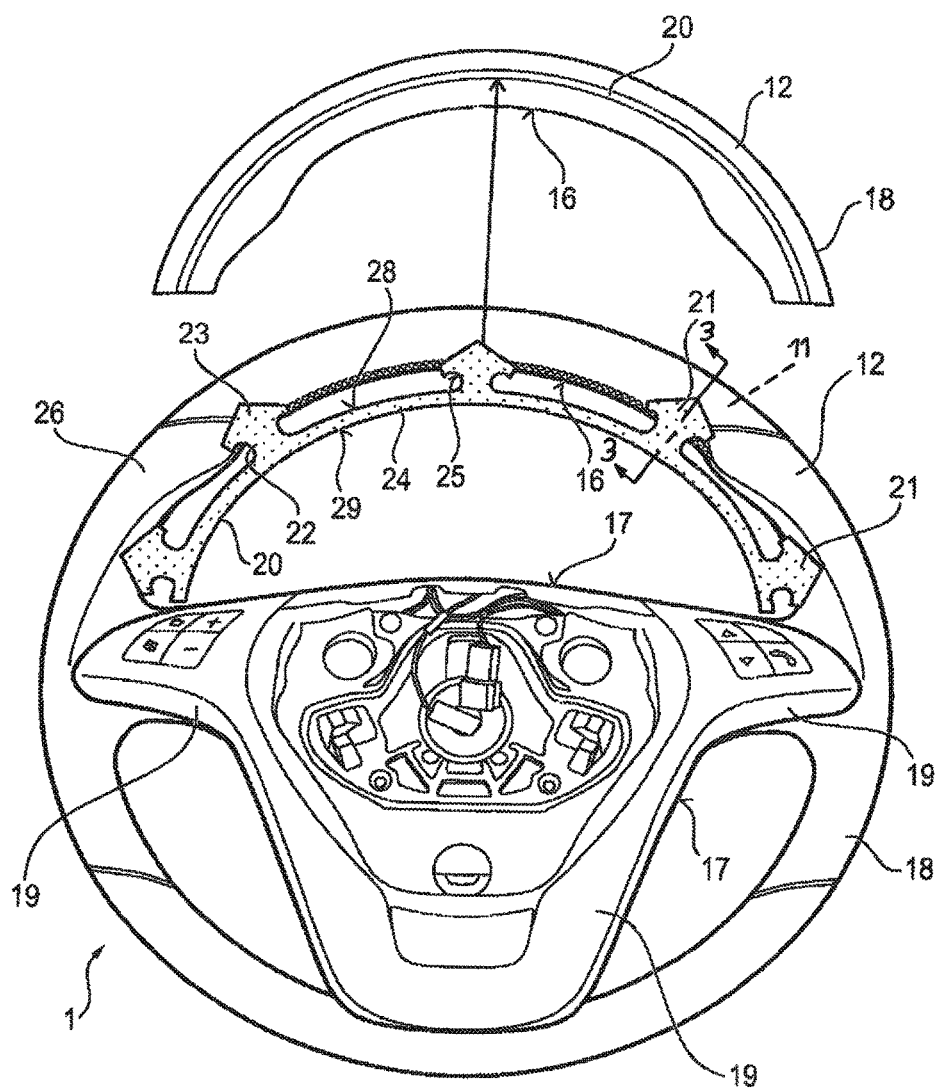
FIG. 2 shows a top view of a steering wheel comprising a profile bead for being directly fastened in the foam padding.

FIGS. 1-2 illustrate a foam-padding mold 30 which serves for foam-covering steering wheel skeletons 10. During manufacture of a steering wheel 1 first of all a steering wheel skeleton 10 is provided. The steering wheel skeleton 10 may be formed of a magnesium alloy or an aluminum alloy. The steering wheel skeleton 10 is inserted into the foam-padding mold 30. After closing the foam-padding mold 30 the foaming material is injected into the foam-padding mold 30 and in this way the foaming material is injected at least partially around the steering wheel skeleton 10. The foaming material swells so that the dimensionally stable but resilient foam padding 11 is formed.

In the invention an additional method step is provided. Especially inside the foam-padding mold 30 not only the steering wheel skeleton 10 (FIG. 2) but additionally a shaping element 31 is arranged which is schematically represented in a magnification in FIG. 1. The shaping element 31 substantially constitutes a template provided for introducing undercuts into the foam padding 11 (FIG. 2).

In the magnification according to FIG. 1 the configuration of the shaping element 31 is clearly evident. The shaping element 31 in the shown embodiment serves for introducing undercuts into an inner circumferential surface 16 of a steering wheel rim 18 of the steering wheel. For this purpose, the shaping element 31 includes a base plate 33 comprising an outer edge 34. The outer edge 34 is curved and substantially follows the curvature of the steering wheel rim 18. In the base plate 33 furthermore positioning apertures 36 are provided. The shaping element 31 can be retained properly and safely in the foam-padding mold 30 by means of the positioning apertures 35. In order to obtain an exact positioning it is of advantage to provide at least three positioning apertures 35 in the base plate 33.

Plural extensions 32 extend starting from the outer edge 34 of the shaping element 31. During the foam-padding operation the extensions 32 are surrounded by the foaming material and thus form the undercuts 14 in the foam padding 11. Preferably the extensions 32 are equally formed. It is also possible, however, to design the extensions 32 to have different geometries.

Each individual extension 32 includes a neck portion 36 and a tip portion 37. The tip portion 32 is arrow-shaped and at its base is wider than the neck portion 36. The extension 32, especially the tip portion 37, substantially exhibits a barb-like configuration.

An essential aspect in the manufacturing method described here is the time for removing the shaping element 31 from the foam padding 11. It is especially provided that the shaping element 31 remains in the foam-padding mold 30 during the foam-padding operation so that also the extensions 32 of the shaping element 31 are foam-padded. The foam-padding mold 30 is filled with heated foaming material. After opening the foam-padding mold 30 the extension 32 is immediately removed as long as the foam padding 11 and, resp., the foaming material is still provided in the heated state. The foaming material has certain elasticity so that after removing the shaping element 31 the undercuts 14 remain in the foam padding 11. If the shaping element 31 is not removed before the foam padding 11 is cooled, there is the risk of the foam padding 11 tearing during removal of the shaping element 31 especially due to the barb-like design of the extensions 32 and in this way no efficient undercuts 14 can be formed. In order to avoid this, the shaping element 31 is removed in the heated state of the foam padding 11.

In FIG. 2 the fixation of a wrapping 12 to the foam-padded steering wheel skeleton 10 is schematically shown. In total, FIG. 2 illustrates a steering wheel 1 having a steering wheel rim 18 and steering wheel spokes 19. The steering wheel 1 is provided with a wrapping 12, for example leather or imitation leather wrapping. In common steering wheels the wrapping 12 is usually fixed by a stitching on an inner circumferential surface 16 in the upper area of the steering wheel rim 18.

In FIG. 2 the alternative provided according to the present invention to insert a profile bead 20 instead of the stitching is schematically indicated. The profile bead 20 has a curved shape, with the curvature of the profile bead 20 substantially corresponding to the curvature of the inner circumferential surface 16 of the steering wheel rim 18. The profile bead 20 includes plural anchoring elements 21 which are arranged spaced apart from each other.

Each of the anchoring elements 21 comprises a shank 22 and a head 23. It is provided of preference that the anchoring elements 21 have a shape corresponding to the shape of the extensions 32 of the shaping element 31. This ensures that the anchoring elements 21 are complementary to the undercuts 14 in the foam padding 11 of the steering wheel 1. The shank 22 connects the head 23 of the anchoring element 21 to a joint decorating flange 24 which interconnects the anchoring elements 21. The decorating flange 24 covers the longitudinal edges 13 of the wrapping 12 in the mounted state of the profile bead 20. The decorating flange 24 thus is visible to the outside and has an appropriately decorative design. The decorating flange 24 may comprise a wrapping made of leather, imitation leather or wooden veneer so as to impart an overall high-quality appearance to the steering wheel 1. It is also possible that the decorating flange 24 or the entire profile bead is made of metal or at least includes a metal coating. For example, the decorating flange 24 may include at least on the outer surface 29 visible in the mounted state a chromium layer or aluminum layer, especially an aluminum layer having a brush-finished surface. The decorating flange 24 may also comprise a carbon composite material.

In the detailed view according to FIG. 2 a variant is shown in which the profile bead 20 is not arranged on an inner circumferential surface 16 of the steering wheel rim 18 but is fixed to a front face 24. In this variant the wrapping 12 is positioned so that the longitudinal edges 13 thereof are adjacent to each other on the front face 26. The profile bead 20 is directly fixed in the foam padding 11 so that the decorating flange 24 of the profile bead 20 covers the longitudinal edges 13 of the wrapping 12 arranged on the front face 26. In the detailed view according to FIG. 2 it is clearly visible that the decorating flange 24 forms a decorative element of the steering wheel rim 18.

Figure 3:
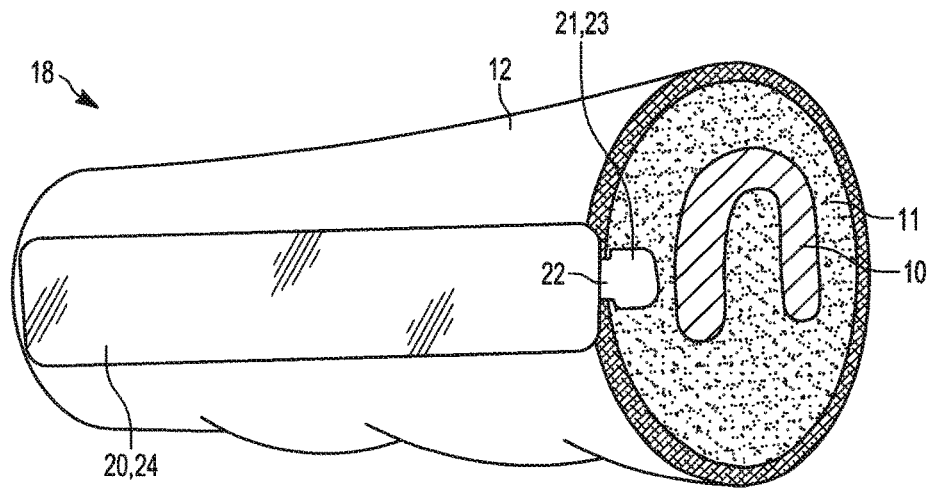
FIG. 3 shows a section view of a portion of the steering wheel rim of FIG. 2 taken along line 3-3 and comprising a profile bead which is directly fixed in the foam padding.
Figure 4:
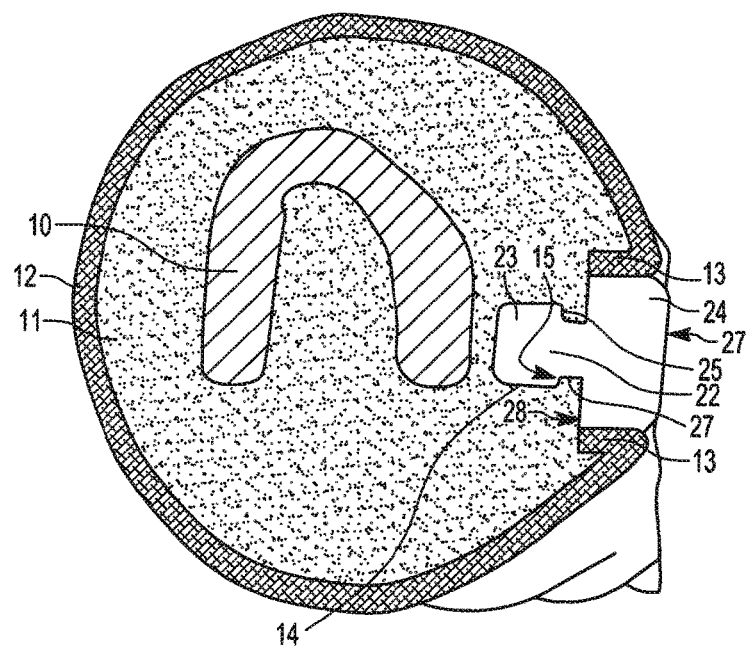
FIG. 4 shows a cross-sectional view of the steering wheel rim according to FIG. 3.

The FIGS. 3 and 4 illustrate an alternative configuration of a profile bead 20, wherein especially the anchoring of the profile bead 20 in the foam padding 11 is evident. In particular a section across a steering wheel rim 18 is shown.

The core of the steering wheel rim 18 is formed by the steering wheel skeleton 10. The steering wheel skeleton 10 has a U-shaped metal profile in the present embodiment. The U-shaped metal profile may include a magnesium alloy or an aluminum alloy. Moreover a reinforcing insert, for example made of round steel, may be designed to be inserted into the U-shaped metal profile.

The steering wheel skeleton 10 is surrounded by foam padding 11. The foam padding 11 may be formed by polyurethane foam, plastic material, expanded polypropylene, expanded polystyrene or other materials adapted to be foamed. It is also indicated in FIGS. 3 and 4 that an undercut 14 is formed in the foam padding 11. The undercut 14 is formed by arranging a shaping element 31 during the foam-padding process. The shape of the undercut 14 thus corresponds to the female mold of the extensions 32 of the shaping element 31. In the embodiment according to FIGS. 3 and 4 the extension 32 of the shaping element 31 includes a tip portion 37 in the form of a round head so that a substantially cylindrical undercut 14 is formed in the foam padding 11. The undercut 14 in any case includes a mating surface 15 which directly impinges on a shank passage 27 and is aligned at right angles or at an acute angle with the shank passage 27. The mating surface 15 in this respect constitutes a stop for an anchoring element 21 and prevents the anchoring element 21 from being easily detached from the foam padding 11.

The foam padding 11 of the steering wheel 1 is provided with a wrapping 12. It is preferred that the wrapping 12 is a leather layer or imitation leather layer which is put over the foam padding 11. Thus longitudinal edges 13 of the wrapping 12 get into contact with each other. Preferably the wrapping 12 is laid around the steering wheel rim 18 such that the longitudinal edges 13 are located on an inner circumferential surface 16 of the steering wheel rim 13. It is preferably provided that the wrapping 12 is shaped and dimensioned so that the longitudinal edges 13 are directly adjacent to each ether, especially without overlapping each other.

FIGS. 3 and 4 further indicate the profile bead 20 which is provided for fixing the wrapping 12 to the foam padding 11. The profile bead 20 includes a decorating flange 24 which in the mounted state of the profile bead 20 immerses into the foam padding 11 preferably such that the outer surface 29 thereof ends flush with the outer circumferential surface of the wrapping 12 (FIG. 4). One or more anchoring elements 21 extend from the decorating flange.

The anchoring element 21 comprises a shank 22 and a head 23. As is clearly visible in FIG. 4, the shank 22 extends through the shank passage 27 in the foam padding 11. Accordingly, the head 23 engages with the undercut 14 in the foam padding 11. For this purpose the head 23 of the anchoring element 21 includes a retaining surface 25 extending from the shank 22. In the embodiment shown here the retaining surface 25 extends perpendicularly to the shank 22. However, it is also possible that the retaining surface 25 is aligned at an acute angle with the shank 22. This is indicated in the anchoring elements according to FIG. 2.

The retaining surface 25 gets info contact with the mating surface 15 in the locked state of the profile bead 20. The surface contact between the retaining surface 25 and the mating surface 15 prevents the profile bead 20 from being removable from the undercut 14. In this way an especially stable positive connection is made between the profile bead and the foam padding 11. It has turned out to be especially advantageous that the profile bead 20, especially the anchoring element 21, is directly connected to the foam padding 11 and, resp., is directly fixed in the foam padding 11. Hence there is a direct contact between the foam padding 11 and the anchoring element 21. This increases the stability of the connection between the wrapping 12 and the foam padding 11 by means of the profile bead 20.

It is also indicated in FIG. 4 that the longitudinal edges 13 of the wrapping 12 are fixed by clamping to the foam padding 11 by the profile bead 20. Although in the shown embodiment the longitudinal edges 13 substantially extend in parallel to the side faces of the decorating flange 24, it may also be provided in a preferred way that the longitudinal edges 13 extend between the retaining surface 25 and an inner surface 28 of the decorating flange 24. In this way the fixation of the wrapping 12 to the foam padding 11 is improved.

In addition to the positive fixation of the profile bead 20, the profile bead 20 may be designed to be bonded to the foam padding 11 and/or the wrapping 12. Moreover it may be provided that the wrapping 12 is first bonded to the foam padding 11, before the profile bead 20 is inserted into the foam padding 11 as final fixation.

The profile bead 20 may comprise plastic material, metal, wood or a combination of the foregoing materials. It is also possible that the profile bead 20 is additionally provided with leather or imitation leather, in particular on the outer surface 29 of the decorating flange 24. Finally it may further be provided that the profile bead 20 includes bores for receiving fixing screws, in this way the profile bead 20 can be additionally screwed with the foam padding 11.

The embodiments illustrated in the Figures provide to use the profile bead 20 on a steering wheel rim 18. The fixing of the wrapping 12 to the foam padding 11 according to the invention may be provided in the area of the steering wheel spokes 19, however. It is especially advantageous to insert the profile bead 20 at the steering wheel spokes 19 in the area of an inner surface 17. The inner surface 1 of the steering wheel spokes 19 is referred to as the surface which is arranged directly opposite to the inner circumferential surface 16 of the steering wheel rim 18. In particular, the inner surface 17 of a steering wheel spoke 19 extends between a front face and a rear face, i.e. substantially perpendicularly to a plane which is defined by the steering wheel rim 18. The inner surface 17 is correspondingly denoted in FIG. 2.

LIST OF REFERENCE NUMERALS 1 steering wheel
10 steering wheel skeleton
11 foam padding
12 wrapping
13 longitudinal edge
14 undercut
15 mating surface
16 inner circumferential surface
17 inner surface
18 steering wheel rim
19 steering wheel spoke
20 profile bead
21 anchoring element
22 shank
23 head
24 decorating flange
25 retaining surface
26 front face
27 shank passage
28 inner surface
29 outer surface 30 foam-padding mold
31 shaping element
32 extension
33 base plate
34 outer edge
35 positioning aperture
36 neck portion
37 tip portion

The invention claimed is:

1. A steering wheel (1), comprising a steering wheel skeleton (10), a foam padding (11) at least partly surrounding the steering wheel skeleton (10) and a wrapping (12) which encompasses the foam padding (11) at least in portions, wherein adjacent longitudinal edges (13) of the wrapping (12) are covered by a profile bead (20) comprising a decorative bead (24), wherein the profile bead (20) includes at least one anchoring element (21) which is directly fixed in the foam padding (11) for fastening the wrapping (12), the anchoring element (21) including a shank (22) and a head (23) with the foam padding (11) directly contacting both the entire length and the entire perimeter of the shank (22).

2. The steering wheel (1) according to claim 1, wherein the anchoring element (21) engages in an undercut (14) which is formed in the foam padding (11), wherein the head (23) has a retaining surface (25) aligned substantially perpendicularly to or at an acute angle with the shank (22) and being adjacent at least partially flush to a mating surface (15) of the undercut (14) of the foam padding (11).

3. The steering wheel (1) according to claim 1, wherein the longitudinal edges (13) of the wrapping (12) are fixed to the foam padding (11) at least in portions exclusively by the profile bead (20) and/or wherein the profile bead (20) interconnects the longitudinal edges (13) of the wrapping (12), and wherein the profile bead (20) is arranged on an inner circumferential surface (16) of a steering wheel rim (18) and/or on an inner surface (17) of a steering wheel spoke.

4. The steering wheel (1) according to claim 1, wherein the wrapping (12) is formed by leather and/or imitation leather.

5. The steering wheel (1) according to claim 1, wherein the profile bead (20) includes plural anchoring elements (21) arranged to be spaced apart from each other, wherein the foam padding (11) has a corresponding number of undercuts (14).

* * * * *